(12) United States Patent
Khot et al.

(10) Patent No.: US 11,425,448 B1
(45) Date of Patent: Aug. 23, 2022

(54) REFERENCE-BASED STREAMING VIDEO ENHANCEMENT

(71) Applicant: Amazon Technologies, Inc., Seattle, WA (US)

(72) Inventors: Tejas Shamrao Khot, Seattle, WA (US); Nataliya Shapovalova, Sammamish, WA (US); Silviu Stefan Andrei, Kirkland, WA (US); Walterio Wolfgang Mayol Cuevas, Seattle, WA (US); Wasiq Bokhari, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/219,278

(22) Filed: Mar. 31, 2021

(51) Int. Cl.
*H04N 21/431* (2011.01)
*H04N 5/783* (2006.01)
*G06T 5/00* (2006.01)
*H04N 21/2662* (2011.01)
*H04N 21/81* (2011.01)
*H04N 21/2343* (2011.01)

(52) U.S. Cl.
CPC ......... *H04N 21/4312* (2013.01); *G06T 5/009* (2013.01); *H04N 5/783* (2013.01); *H04N 21/23439* (2013.01); *H04N 21/2662* (2013.01); *H04N 21/8153* (2013.01)

(58) Field of Classification Search
CPC ......... H04N 21/4312; H04N 21/23439; H04N 21/8153; H04N 5/783; H04N 21/2662; G06T 5/009
See application file for complete search history.

(56) References Cited

U.S. PATENT DOCUMENTS

| 9,560,315 | B1 | 1/2017 | Silberman et al. |
| 10,904,488 | B1 | 1/2021 | Weisz et al. |
| 2003/0023910 | A1 * | 1/2003 | Myler ............ G06F 11/00 |

(Continued)

FOREIGN PATENT DOCUMENTS

WO WO 20220/018458 A1 * 1/2020 ......... H04N 21/6547

OTHER PUBLICATIONS

Wang et al.; "Image Inpainting via Generative Multi-column Convolutional Neural Networks"; Computer Vision and Pattern Recognition; Oct. 2018; 10 pages.

(Continued)

*Primary Examiner* — Anthony Bantamoi
(74) *Attorney, Agent, or Firm* — BakerHostetler

(57) ABSTRACT

An input video stream corresponding to input video content may be received over one or more networks. The input video stream may include a first image frame. An input visual feature of the first image frame may be matched to a reference visual feature of a reference image. The reference image may have a higher image quality than the first image frame. A replacement visual feature may be generated for the input visual feature. The replacement visual feature may be generated based at least in part on the reference visual feature. An enhanced image frame corresponding to the first image frame may be generated by at least replacing the input visual feature in the first image frame with the replacement visual feature. An enhanced video stream may be provided. The enhanced image frame may be a substitute for the first image frame in the enhanced video stream.

17 Claims, 9 Drawing Sheets

(56) References Cited

U.S. PATENT DOCUMENTS

| | | | |
|---|---|---|---|
| 2006/0123445 A1* | 6/2006 | Sullivan | ............... H04N 5/445 |
| 2007/0242066 A1 | 10/2007 | Levy | |
| 2008/0231686 A1 | 9/2008 | Redlich | |
| 2010/0295920 A1 | 11/2010 | McGowan | |
| 2016/0205428 A1 | 7/2016 | McDonough et al. | |
| 2016/0301727 A1 | 10/2016 | Barjonas et al. | |
| 2018/0089880 A1 | 3/2018 | Garrido et al. | |
| 2020/0358983 A1 | 11/2020 | Astarabadi et al. | |
| 2021/0329338 A1 | 10/2021 | Khov et al. | |

OTHER PUBLICATIONS

Prenger et al.; "WaveGlow: A Flow-based Generative Network for Speech Synthesis"; Artificial Intelligence, Machine Learning, Audio and Speech Processing, Machine Learning; Oct. 2018; 5 pages.

Ulyanov et al.; "Deep Image Prior"; Proceedings of the IEEE Conf. on Computer Vision and Pattern Recognition; May 2020; 23 pages.

Perraudin et al.; "Inpainting of long audio segments with similarity graphs"; Artificial Intelligence, Multimedia, Software Engineering; Feb. 2018; 13 pages.

Qu et al.; "LipSound: Neural Mel-spectrogram Reconstruction for Lip Reading"; Interspeech; Sep. 2019; p. 2768-2772.

"Facial Action Coding System", Wikipedia, https://en.wikipedia.org/wiki/Facial_Action_Coding_System, web-archive capture from Aug. 7, 2020, accessed on Jul. 26, 2021 from https://web.archive.org/web/20200807130644/https://en.wikipedia.org/wiki/Facial_Action_Coding_System; 10 pages.

Nithiroj Tripatarasit; "Facial Keypoints Detection with PyTorch"; https://medium.com/diving-in-deep/facial-keypoints-detection-with-pytorch-86bac79141e4; May 2019; accessed Sep. 7, 2021; 29 pages.

Wang et al.; "Deep Learning for Image Super-resolution: A Survey"; IEEE Computer Vision and Pattern Recognition; Feb. 2020; 24 pages.

Liu et al.; "Video Super Resolution Based on Deep Learning: A Comprehensive Survey"; Computer Vision and Pattern Recognition; Jul. 2020; 24 pages.

Yang et al.; "Learning Texture Transformer Network for Image Super-Resolution"; Computer Vision and Pattern Recognition; Jun. 2020; 22 pages.

Han et al.; "A Survey on Visual Transformer"; Computer Vision and Pattern Recognition; Jan. 2021; 26 pages.

Liu et al.; "Video Super Resolution Based on Deep Learning: A Comprehensive Survey"; Computer Vision and Pattern Recognition; Dec. 2020, 30 pages.

* cited by examiner

REFERENCE-BASED STREAMING VIDEO ENHANCEMENT

BACKGROUND

Over the past few years, video streaming has become increasingly popular. The term video streaming, as used herein, refers to scenarios in which portions of a transmitted video item are played while subsequent portions of the video item are still being transmitted. In particular, live video streaming has become common. In live video streaming, video content of an event (e.g., live video game, live video conference, live sporting event, etc.) is transmitted and played while the event is still occurring, albeit with some small amounts of latency between the time that the video content is captured and the time that the video content is eventually played to viewers. One limitation of streaming of video over a network is that bandwidth may be limited, for example due to network quality constraints. These bandwidth availability issues may often cause image quality to be degraded. This may be particularly problematic in live streaming scenarios (and other low latency streaming scenarios) in which transmission delays may be unacceptable to viewers. Poor image quality may often be frustrating to a viewer and may result in dissatisfaction with the viewer's streaming experience.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
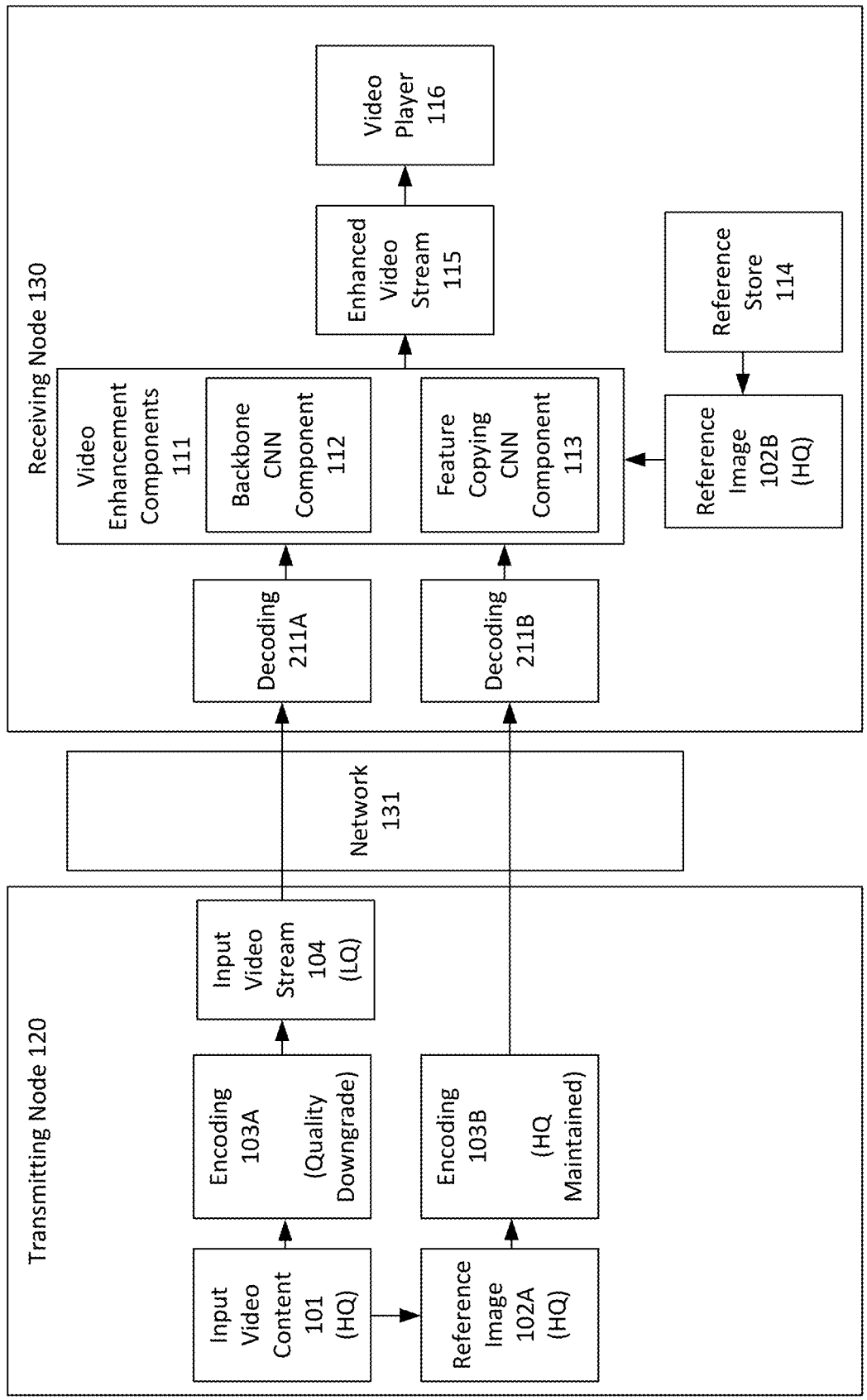
FIG. 1 is a diagram illustrating an example receiving node-based video enhancement system that may be used in accordance with the present disclosure.

Techniques for reference-based streaming video enhancement are described herein. Input video content may be transmitted over one or more networks, from a transmitting node to a receiving node, using streaming transmission techniques. Thus, an input video stream that includes the input video content may be received by the receiving node. As described herein, an image in the input video stream may be enhanced based on features from a reference image. The reference image may have a higher image quality (e.g., a higher resolution, a higher encoding bitrate, etc.) than images in the input video stream. In some examples, a visual feature, such as a texture, in a lower quality image from the input video stream may be matched to a visual feature, such as a texture, in a higher quality reference image. The matching visual feature may then be copied from the reference image and inserted into the lower quality image at the location of the matching visual feature in the lower quality image. The visual feature from the reference image may optionally be modified when inserted into the lower quality image, such as by modifying its size, shape, blending the visual feature with other visual features, and the like. In this manner, lower quality images in the input video stream may be enhanced by extracting matching visual features from higher quality reference images.

In some examples, a reference image may include an image frame that is part of the input video content that is being transmitted to the receiving node. For example, during transmission of the input video content, the transmitting node may be configured to send primarily lower quality frames, but to periodically (e.g., every few seconds) send an intermittent higher quality frame (i.e., the reference image). In some examples, the higher quality frame may be sent over an additional connection that is separate from the input video stream that includes the lower quality frames. For example, in some cases, a video streaming service may transmit video content over a video channel that has a corresponding respective data channel. In some examples, the input video stream may be transmitted using the video channel, and the reference images may be transmitted using the corresponding respective data channel. In other examples, the reference images may be transmitted using a separate low frames per second (FPS) video stream. In yet other examples, the reference images may be transmitted within the same video stream as the lower quality frames. For example, the higher quality reference images may be transmitted as high resolution I-frames (intra-coded picture frames) in the input video stream. Additionally, in some examples, the reference images may be stored and used again in the future.

In some examples, the reference image that is transmitted over the network may include a full respective frame from the input video content. In order to save bandwidth, the image may be compressed using a standard format like Joint Photographic Experts Group (JPEG) or WebP and also sent as a whole, or segmented, for avoiding bandwidth peaks. In other examples, the reference image that is transmitted over the network may include only portions (i.e., less than all) of the respective frame from the input video content. For example, the reference image may be a masked image generated using masking techniques, in which a model running on the transmitting node predicts a mask suggesting which regions of the reference frame should be transmitted at any given time. The masked image may be further compressed using a standard format like JPEG or WebP. In another example, the reference image may be generated using semantic segmentation techniques, in which only certain objects, or categories of objects, are transmitted as a reference image. For example, only faces in a reference frame may be transmitted in a reference image so that faces are properly rendered to increase overall perceptual image quality. In yet other examples, the reference image may be generated as a foveated image, in which different regions of the reference frame may be encoded at different bitrates and/or sent at different time frequencies. The encoding factors for each region may be determined using a learning-based model or predefined based on heuristics. For example, the central region of the frame may be retained in full quality while the areas around the border may be encoded at a lower quality setting, as the central region tends to have higher levels of interest to viewers. As another example, central regions of reference frames may be sent more frequently than the periphery of the reference frames.

In some examples, the reference image may be compressed using learned compression. For example, a model may be used on the transmitting node to produce a compressed derivative of the reference frame that uses lower bits per pixel (bps) than standard formats like JPEG or WebP. The resulting representation of the image may not be human interpretable. A counterpart of the model on the receiving node may decode the image into a format that can be consumed by the video enhancement model. Additionally, in some examples, the reference image may be change triggered. For example, all, or part, of a reference frame may be transmitted only when there is a difference in the reference frame relative to one or more prior frames of the input video content, such as motion or lighting changes that exceed certain thresholds. Furthermore, in some examples, the reference image may be a high dynamic range (HDR) image, for example with low noise, created over the time stipulated for the frequency of the reference frames. Such an HDR reference image with low noise may enable reconstructing real-time video that has high visual performance in low light even when a camera that captured the video is less performant.

In some examples, as an alternative, or in addition to, obtaining the reference images from frames within the transmitted video content, the reference images may also be obtained from a stored collection of reference images, such as may be stored at the receiving node and/or another location. This reference store may be organized in a variety of ways. In some examples, each reference image in the reference store may be tagged with location information (e.g., global positioning system (GPS) coordinates) indicating locations of the reference image, such as locations from which the reference image was captured and/or transmitted. Relevant reference images may then be retrieved using this location information. For example, in some cases, the reference store may be queried using current location information for the transmitting node and/or the receiving node. Images having tagged location information that matches the current location information may then be obtained from the reference store and optionally used as reference images for enhancing one or more frames from the input video stream. It is expected that images having tagged location information that matches the current location information may be more relevant to the transmitted video than other stored images with non-matching location information.

Additionally, in some examples, each image in the reference store can be simplified to a structural epitome, which is a condensed visual form that is smaller than its original size but that still retains the distinct textural and shape properties of the original. This visual summary can be used instead of a full reference image. For example, if an image contains a large area of grass, the texture of the grass may be condensed down to a small patch or other area that has the same (or similar) texture but that occupies much less area. The same may be done for other features in the image (e.g., sky, clouds, water, buildings, etc.). This option can also be done while streaming if the epitome is created at the transmitting node. Furthermore, in some examples, images may be stored using an appearance-based algorithm, such as a feature dictionary, for image query and retrieval. For example, features may be assigned certain labels (e.g., grass, sky, clouds, water, buildings, etc.) when their visual features match certain learned visual features that are indicative of a respective label. An image may then be tagged with labels for visual features that are included in the image. For retrieval, a visual feature from a current frame of the input video stream can be compared with those in the dictionary and the closest match can be used as a reference frame. For example, a label may be determined for a feature in the current frame of the input video stream and then matched to one or more reference images that are tagged with a matching label. This option can also be done while streaming if the features in the reference images are identified at the transmitting node.

In some examples, video enhancement components that perform any, or all, of the above described video enhancement techniques may employ a number of convolutional neural network (CNN) based models. For example, the video enhancement components may include a feature copying CNN component and a backbone CNN component. The feature copying CNN component may perform any, or all, of the above described feature copying techniques in accordance with a CNN based model. These may include, for example, identification of visual features of a current frame of the input video stream, identification of visual features of one or more reference images, matching of visual features in the current frame of the input video stream to corresponding visual features in the one or more reference images, and copying of the matching visual features from the one or more reference images to the backbone CNN component. In some examples, the feature copying CNN component may generate a soft and hard attention map based on a similarity metric. In this context, hard attention refers to the selection of a best matching visual feature (or a set of multiple best matching features) that are copied from the one or more reference images. Additionally, soft attention refers to a determination of an amount of influence each copied feature has. For example, an influence (e.g., relative weight) of each copied visual feature may be controlled by the extent of its match (e.g., degree of similarity) to the visual feature from the current frame of the input video stream, for example such that better matches are assigned a greater influence and poorer matches are assigned a lesser influence. The feature copying CNN component may provide the copied features to the backbone CNN component, which may produce an enhanced output frame based on the current frame of the input video stream and the visual features that are copied from the reference images. The backbone CNN component may also perform its techniques in accordance with a CNN based model. The copied visual features may be blended according to the soft and hard attention map and inserted into the current frame of the input video stream to replace the corresponding respective lower quality visual features.

FIG. 1 is a diagram illustrating an example receiving node-based video enhancement system that may be used in accordance with the present disclosure. As shown in FIG. 1, an input video stream 104 is transmitted over network 131 from transmitting node 120 to receiving node 130, using streaming transmission techniques. The transmitting node 120 may include one or more computing devices, while the receiving node 130 may include one or more other computing devices. In some examples, network 131 may include one or more networks, such as one or more local area networks (LANs) and/or one or more wide area networks (WANs) such as the Internet. As described herein, an image in the input video stream 104 may be enhanced based on features from reference image 102A and/or reference image 102B (collectively referred to as reference images 102).

The reference images 102 may have a higher image quality (e.g., a higher resolution, a higher encoding bitrate, etc.) than the input video stream 104. For example, as shown in FIG. 1, the input video stream 104 includes input video content 101. An encoding 103A may be performed on the input video content 101 to generate the input video stream 104. The encoding 103A may downgrade the video quality of the input video content 101 from a higher quality (HQ) to a lower quality (LQ). For example, encoding 103A may lower/downscale the resolution of the input video content 101 to generate the input video stream 104. Additionally, encoding 103A may encode the input video stream 104 using a low bitrate, such as a bitrate that is lower than the bitrate at which the reference image 102A may be encoded.

In the example of FIG. 1, reference image 102A is generated based on a respective reference frame from the input video content 101. The reference image 102A may correspond to a respective frame of input video content 101 and may be derived from the respective frame before the respective frame is encoded via encoding 103A. Thus, in this scenario, the image quality of the reference image 102A is not downgraded via encoding 103A. By contrast, an encoding 103B may be performed on the reference image 102A. The encoding 103B may maintain the higher quality of the reference image 102A. This does not necessarily mean that the image quality of the reference image 102A is not downgraded at all during encoding 103B. Rather, this merely indicates that the image quality of reference image 102A is not downgraded via encoding 103B as much as the image quality of the input video stream 104 is downgraded via encoding 103A. Thus, the reference image 102A has a higher image quality than frames from the input video stream 104. For example, the resolution of reference image 102A may be higher than the resolution of frames from the input video stream 104. Additionally, the reference image 102A may be encoded at a high bitrate, such as a bitrate that is higher than the bitrate at which the input video stream 104 may be encoded.

Upon receipt by the receiving node 130, a decoding 211A may be performed on the input video stream 104, and a decoding 211B may be performed on the reference image 102A. The input video stream 104 and the reference image 102A may then be provided to video enhancement components 111. Video enhancement components 111 may also optionally obtain reference image 102B from reference store 114. The video enhancement components 111 include a feature copying CNN component 113 and a backbone CNN component 112. The feature copying CNN component 113 may perform techniques in accordance with a CNN based model. These may include, for example, identification of visual features, such as textures, of a current frame of input video stream 104, identification of visual features, such as textures, of one or more the reference images 102, matching of visual features in the current frame of the input video stream 104 to corresponding visual features in one or more of reference images 102, and copying of the matching visual features from one or more of the reference images 102 to the backbone CNN component 112.

In some examples, the feature copying CNN component 113 may generate a soft and hard attention map based on a similarity metric. In this context, hard attention refers to the selection of a best matching visual feature (or a set of multiple best matching features) that are copied from one or more of the reference images 102. Additionally, soft attention refers to a determination of an amount of influence each copied feature has. For example, an influence (e.g., relative weight) of each copied visual feature may be controlled by the extent of its match (e.g., degree of similarity) to the visual feature from the current frame of the input video stream 104, for example such that better matches are assigned a greater influence and poorer matches are assigned a lesser influence. The feature copying CNN component 113 may provide the copied features to the backbone CNN component 112, which may produce an enhanced output frame based on the current frame of the input video stream 104 and the visual features that are copied from the reference images 102. The backbone CNN component 112 may also perform its techniques in accordance with a CNN based model. The copied visual features may be blended according to the soft and hard attention map and inserted into the current frame of the input video stream 104 to replace the corresponding respective lower quality visual features. The visual features from the reference images 102 may be inserted into the current frame of the input video stream 104 at the location of the matching visual feature in the current frame of the input video stream 104. The visual features from the reference images 102 may optionally be modified when inserted into the current frame of the input video stream 104, such as by modifying their sizes and shapes, blending the visual features, and the like. In this manner, lower quality images in the input video stream 104 may be enhanced by extracting matching visual features from higher quality reference images 102. The enhanced images may be included in an enhanced video stream 115 that is played by the video player 116.

In some examples, the techniques described herein may allow for live video streaming, meaning that enhanced video stream 115 is played live. For example, input video content 101 may include video of an event (e.g., a live video game, a live sporting event, a live video conference, etc.), and the enhanced video stream 115 may be played while the event is still occurring, albeit with some small amounts of latency between the time that the input video content 101 is captured (e.g., via a camera) and the time that the enhanced video stream 115 is eventually played to viewers.

In the example of FIG. 1, reference image 102A may include an image frame that is part of the input video content 101 that is being transmitted to the receiving node 130. For example, the transmitting node 120 may be configured to send primarily lower quality frames, but to periodically (e.g., every few seconds) send an intermittent higher quality frame (i.e., including reference image 102A). In some examples, the reference image 102A may be sent over an additional connection that is separate from the input video stream 104. For example, in some cases, a video streaming service may transmit the input video stream 104 over a video channel that has a corresponding respective data channel. In some examples, the higher quality reference images (i.e., including reference image 102A) may be transmitted using the corresponding respective data channel. In other examples, the higher quality reference images (i.e., including reference image 102A) may be transmitted using a separate low frames per second (FPS) video stream. In yet other examples, the higher quality reference images (i.e., including reference image 102A) may be transmitted within the same video stream as the lower quality frames (i.e., within input video stream 104). For example, the higher quality reference images may be transmitted as high resolution I-frames in the same video stream as the lower quality images.

Figure 2:
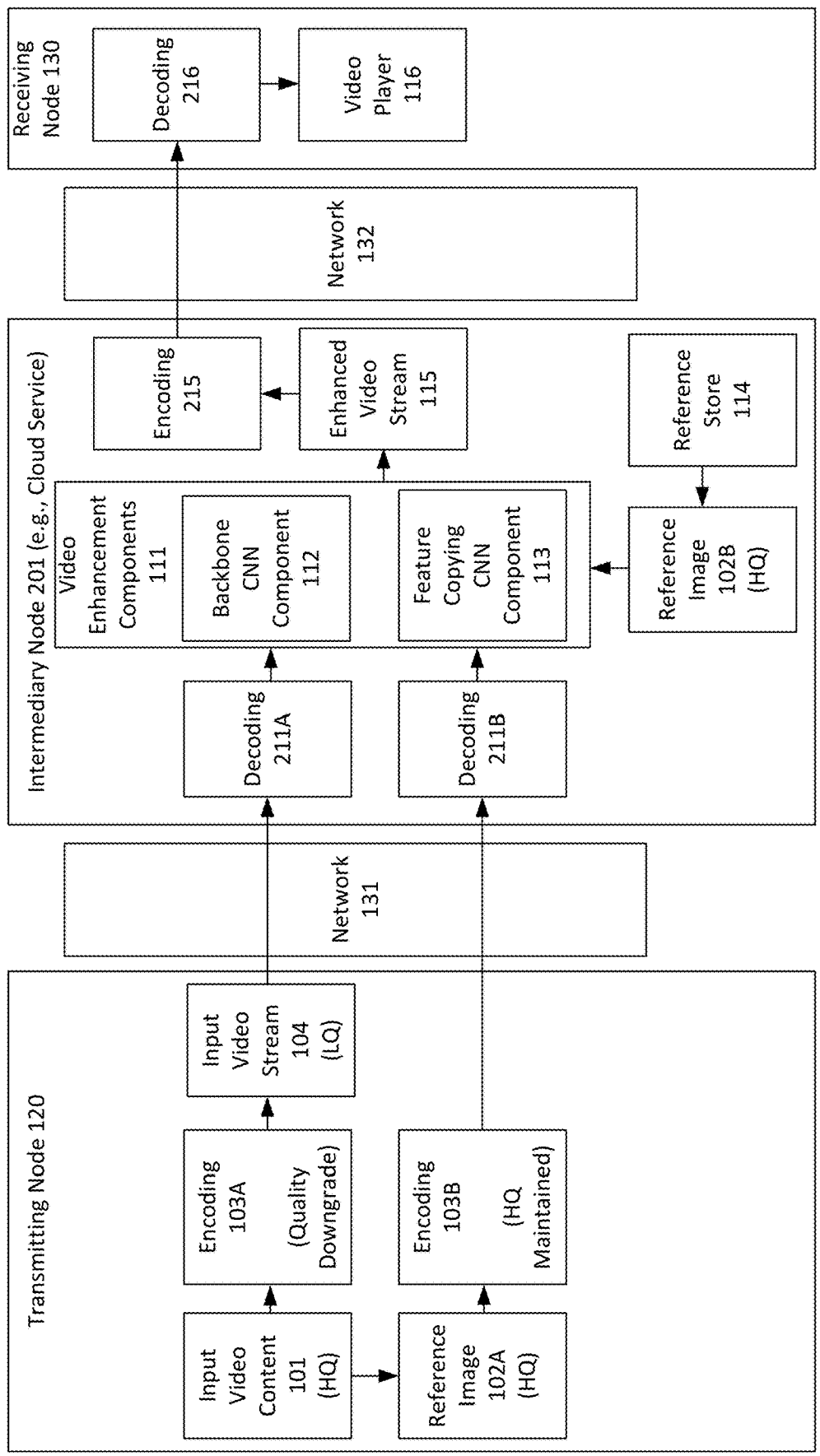
FIG. 2 is a diagram illustrating an example intermediary node-based video enhancement system that may be used in accordance with the present disclosure.

FIG. 1 illustrates an example in which the video enhancement components 111 execute on the receiving node 130. However, it is noted that the video enhancement components 111 may alternatively execute at a different location. Referring now to FIG. 2, an example is shown in which the video enhancement components 111 execute on an intermediary node 201, such as a cloud service. The intermediary node 201 may include one or more computing devices that are not part of transmitting node 120 or receiving node 130. In the example of FIG. 2, an encoding 215 is performed on the enhanced video stream 115 that is output from the video enhancement components 111. The enhanced video stream 115 is then transmitted over network 132 from the intermediary node 201 to the receiving node 130. In some examples, network 132 may include one or more networks, such as one or more local area networks (LANs) and/or one or more wide area networks (WANs) such as the Internet. Upon receipt by the receiving node 130, a decoding 216 is performed on the enhanced video stream 115. The enhanced video stream 115 is then played by video player 116. It is noted that the enhanced video stream 115 may be encoded, at encoding 215, with a higher quality than the input video stream 104 is encoded, at encoding 103A. Thus, the connection between intermediary node 201 and receiving node 130 (over network 132) may be a better (e.g., higher bandwidth) connection than the connection between transmitting node 120 and intermediary node 201 (over network 131).

In some examples, the systems shown in FIGS. 1 and 2 may be used in combination with one another. For example, in some cases, the video enhancement components 111 may execute both at the receiving node 130 and at intermediary node 201 (and optionally one or more other nodes). In these scenarios, the video enhancement components 111 at the receiving node 130 and at intermediary node 201 may combine to generate enhanced video stream 115. For example, in some cases, the video enhancement components 111 at the intermediary node 201 may generate one or more enhanced video frames, while the video enhancement components 111 at the intermediary node 201 may generate one or more other enhanced video frames. In other examples, the video enhancement components 111 at the intermediary node 201 and the receiving node 130 may work together to generate the same enhanced frame. For example, the video enhancement components 111 at the intermediary node 201 may enhance one or more visual features of an input frame, while the video enhancement components 111 at the intermediary node 201 may enhance one or more other visual features of the same input frame. In some examples, the video enhancement components 111 at the intermediary node 201 may receive and use different types of reference images than the video enhancement components 111 at the receiving node 130. For example, in some cases, the video enhancement components 111 at the intermediary node 201 may use only reference images derived from the input video content 101, while the video enhancement components 111 at the receiving node 130 may use only reference images from reference store 114. In other cases, the video enhancement components 111 at the intermediary node 201 may use only reference images from reference store 114, while the video enhancement components 111 at the receiving node 130 may use only reference images derived from the input video content 101. In some examples, the video enhancement components 111 at the intermediary node 201 may receive reference images derived from the input video content 101 at a higher frequency than the video enhancement components 111 at the receiving node 130. In other examples, the video enhancement components 111 at the intermediary node 201 may receive reference images derived from the input video content 101 at a lower frequency than the video enhancement components 111 at the receiving node 130.

Figure 3:
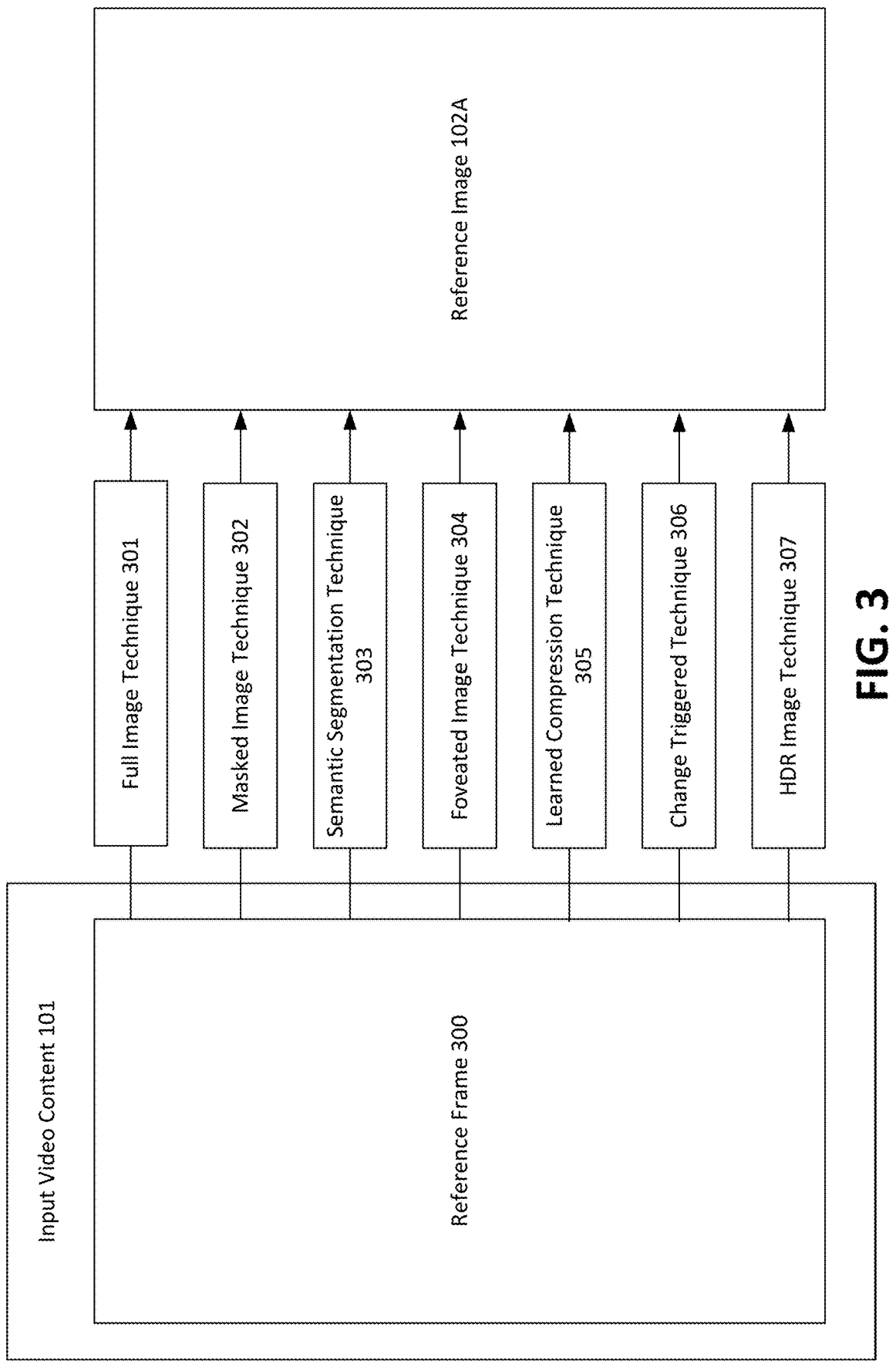
FIG. 3 is a diagram illustrating example reference image generation techniques that may be used in accordance with the present disclosure.

The reference image 102A that is transmitted over the network 131 may be generated using a variety of techniques. Referring now to FIG. 3, some example techniques for generation of reference image 102A will now be described in detail. Specifically, as shown in FIG. 3, reference image 102A may be generated based on a corresponding respective reference frame 300 from the input video content 101 using any combination of one or more techniques. These techniques may include full image technique 301, in which the reference image 102A includes the full reference frame 300. In order to save bandwidth, the reference image 102A may be compressed using a standard format like JPEG or WebP and also sent as a whole, or segmented, for avoiding bandwidth peaks. In other examples, the reference image 102A may include only portions (i.e., less than all) of the reference frame 300. For example, the reference image 102A may be generated using masked image technique 302, in which a model running on the transmitting node 120 predicts a mask suggesting which regions of the reference frame 300 should be transmitted. The masked image may be further compressed using a standard format like JPEG or WebP. In another example, the reference image 102A may be generated using semantic segmentation technique 303, in which only certain objects, or categories of objects, from reference frame 300, are transmitted in reference image 102A. For example, only faces in the reference frame 300 may be transmitted in the reference image 102A so that faces are properly rendered to increase overall perceptual image quality. In yet other examples, the reference image 102A may be generated using foveated image technique 304, in which different regions of the reference frame 300 may be encoded at different bitrates and/or sent at different time frequencies. The encoding factors for each region may be determined using a learning-based model or predefined based on heuristics. For example, the central region of the reference frame 300 may be retained in full quality while the areas around the border may be encoded at a lower quality setting, as the central region tends to have higher levels of interest to viewers. As another example, central regions of reference frames may be sent more frequently than the periphery of the reference frames.

The reference image 102A may also be compressed using learned compression technique 305. For example, a model may be used on the transmitting node 120 to produce a compressed derivative of the reference frame 300 that uses lower bits per pixel (bps) than standard formats like JPEG or WebP. The resulting representation of the image may not be human interpretable. A counterpart of the model on the receiving node may decode the image into a format that can be consumed by the video enhancement model. Additionally, in some examples, the reference image 102A may be transmitted based on change triggered technique 306. For example, all, or part, of the reference frame 300 may be transmitted only when there is a difference in the reference frame 300 relative to one or more prior frames of the input video content 101, such as motion or lighting changes that exceed certain thresholds. Furthermore, in some examples, the reference image 102A may be generated using high dynamic range (HDR) technique 307, for example with low noise, created over the time stipulated for the frequency of the reference frames. Such an HDR image with low noise may enable reconstructing real-time video that has high visual performance in low light even when a camera that captured the input video content 101 is less performant. In some examples, the reference image 102A may be generated based on combinations of two or more of the above-described techniques. Moreover, in some examples, the reference image 102A may be generated based at least in part on one or more other techniques not shown in FIG. 3.

In some examples, as an alternative, or in addition to, obtaining reference images from frames within the transmitted video content, the reference images may also be obtained from a stored collection of reference images, such as reference store 114. The reference store 114 may be compiled with stored images prior to the initiation of the transmitting of the input video stream 104. Thus, reference images that are stored in, and obtained from, reference store 114 may be images that are acquired from a source other than the input video content 101 and the input video stream 104. In one specific example, the input video stream 104 may be transmitted from a mobile device (e.g., mobile phone), while the reference images stored in reference store 114 may be images from a movie film that was not transmitted from the mobile device. As another example, the input video content 101 and input video stream 104 may be video of a video conference, while the reference images stored in reference store 114 may include images that were captured and stored in the reference store 114 before the video conference was initiated. For example, referring back to FIGS. 1 and 2, it is seen that, while reference image 102A is obtained from the input video content 101, reference image 102B is obtained from reference store 114. The reference store 114 may be organized in a variety of ways. In some examples, each reference image in the reference store 114 may be tagged with location information (e.g., global positioning system (GPS) coordinates) indicating locations of the reference image, such as locations from which the reference image was captured and/or transmitted. Relevant reference images may then be retrieved using this location information. For example, in some cases, the reference store 114 may be queried using current location information for the transmitting node 120 and/or the receiving node 130. Reference images having tagged location information that matches the current location information may then be obtained from the reference store 114 and optionally used as reference images for one or more frames in the input video stream. It is expected that reference images having tagged location information that matches the current location information may be more relevant to the transmitted video than other stored images with non-matching location information.

Additionally, in some examples, each image in the reference store 114 may be simplified to a structural epitome, which is a condensed visual form that is smaller than its original size but that still retains the distinct textural and shape properties of the original. This visual summary can be used instead of a full reference image. For example, if an image contains a large area of grass, the texture of the grass may be condensed down to a small patch or other area that has the same (or similar) texture but that occupies much less area. The same may be done for other features in the image (e.g., sky, clouds, water, buildings, etc.). This option can also be done while streaming, such as to create reference image 102A, if the epitome is created at the transmitting node 120. Furthermore, in some examples, images may be stored in the reference store 114 using an appearance-based algorithm, such as a feature dictionary, for image query and retrieval. For example, features may be assigned certain labels (e.g., grass, sky, clouds, water, buildings, etc.) when their visual features match certain learned visual features that are indicative of a respective label. An image may then be tagged with labels for visual features that are included in the image. For retrieval, a visual feature from a current frame of the input video stream 104 can be compared with those in the dictionary and the closest match can be used as a reference frame. For example, a label may be determined for a feature in the current frame of the input video stream 104 and then matched to one or more reference images that are tagged with a matching label. This option can also be done while streaming, such as to tag and label features in reference image 102A, if the features in the reference image 102A are identified at the transmitting node 120.

The reference images can be used in a number of ways. In some examples, for scenarios in which reference images are obtained over a network from the input video content 101 (e.g., as in the case of reference image 102A), the most recently transmitted higher-quality reference image may be used. This is because the most recently received higher quality reference image is likely to be the most relevant to the current lower quality frame of the input video stream 104 that is being enhanced. In some examples, multiple prior references images may be used, for example the most recent five or ten reference images could be used. For scenarios in which reference images are obtained from the reference store 114 (e.g., as in the case of reference image 102B), a search for a single best matching image (or multiple best matching images) may be conducted, for example based on characteristics of the current frame of the input video stream 104 as described above. In some examples, a set of multiple reference images may be used to enhance a current frame of the input video stream 104 by picking the best matching regions across the set. Thus, the current frame of the input video stream 104 may be enhanced based on regions from a number of different reference images.

Figure 4:
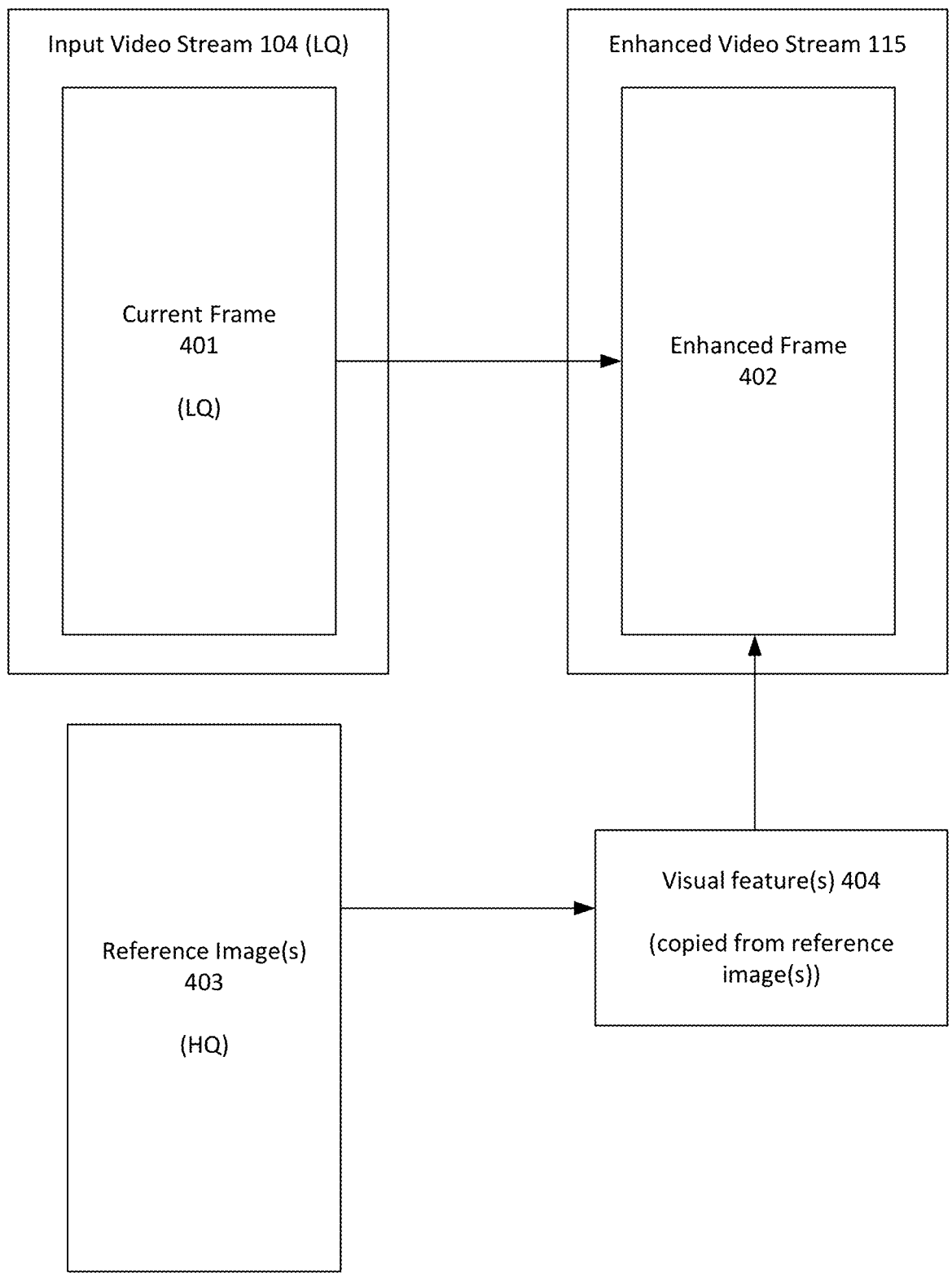
FIG. 4 is a diagram illustrating example generation of an enhanced video frame that may be used in accordance with the present disclosure.

Referring now to FIG. 4, it is shown that an enhanced frame 402 in the enhanced video stream 115 may be generated based on a corresponding current frame 401 in the input video stream 104. Specifically, the enhanced frame 402 may be generated by copying one or more visual feature(s) 404 from one or more reference image(s) 403. The visual feature(s) 404 may then be inserted into the current frame 401 to form enhanced frame 402. The visual feature(s) 404 from the reference image(s) 403 may optionally be modified when inserted into the current frame 401, such as by modifying their sizes and shapes, blending the visual feature(s) 404, and the like. For example, in some cases, the sizes and shapes of the visual feature(s) 404 may be modified to match the sizes and shapes of the lower quality visual feature(s) that they replace in the current frame 401.

Figure 5:
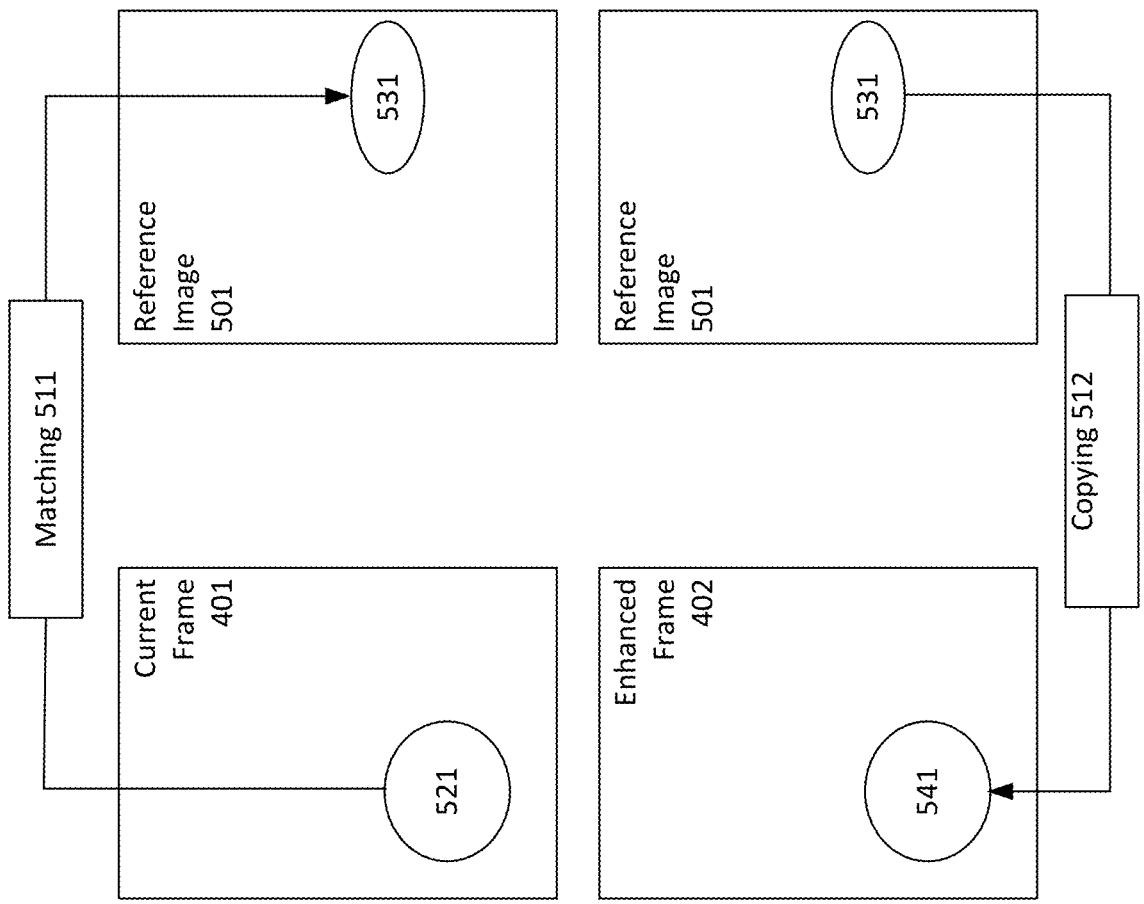
FIG. 5 is a diagram illustrating an example frame enhancement using a single reference image that may be used in accordance with the present disclosure.

Referring now to FIG. 5, an example is shown in which current frame 401 is matched to a single reference image, which is reference image 501. As shown, during matching 511, a visual feature 521 in current frame 401 is matched to a corresponding visual feature 531 in reference image 501. In some examples, the feature copying CNN component 113 may identify each visual feature in the current frame 401, including visual feature 521. For example, the current frame 401 may be analyzed to find visual features that have distinct respective colors and/or patterns. Additionally, the feature copying CNN component 113 may identify each visual feature in the reference image 501, including visual feature 531. For example, the reference image 501 may be analyzed to find visual features that have distinct respective colors and/or patterns. The feature copying CNN component 113 may then attempt to match each visual feature in the current frame 401 with a corresponding visual feature from the reference image 501. For example, the feature copying CNN component 113 may attempt to match colors, patterns and/or other characteristics of a visual feature in the current frame 401 with colors, patterns and/or other characteristics of a visual feature from the reference image 501. In some examples, the feature copying CNN component 113 may divide each visual feature in the current frame 401 and each visual feature in the reference image 501 into smaller patches and perform patch level matches. When these visual features and/or patches in the current frame 401 and the reference image 501 have a similarity that is above a specified threshold, then they may be considered as matches. Thus, during matching 511, visual feature 521 is matched to visual feature 531. Subsequently, during copying 512, the visual feature 531 may be copied from reference image 501 to form a replacement visual feature 541. The enhanced frame 402 may then be generated by inserting the replacement visual feature 541 into current frame 401 to replace visual feature 521. Thus, the replacement visual feature 541 may be generated based on a copy of at least part of visual feature 531. In order to generate replacement visual feature 541, the copy of visual feature 531 may be modified, such as by modifying its size and shape, for example to match the size and shape of visual feature 521.

Figure 6:
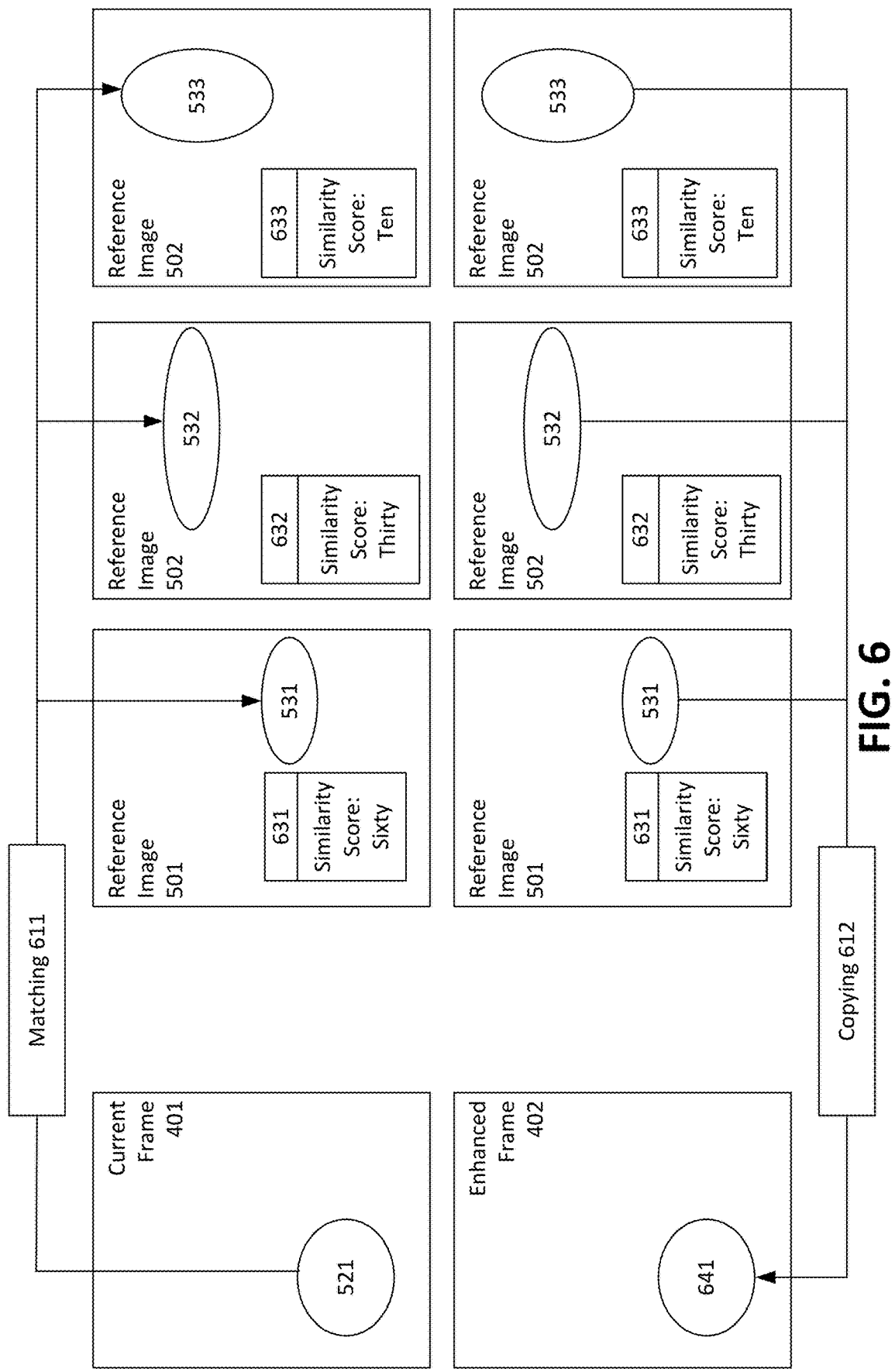
FIG. 6 is a diagram illustrating an example frame enhancement using multiple reference images that may be used in accordance with the present disclosure.

Referring now to FIG. 6, an example is shown in which current frame 401 is matched to a plurality of reference images, which are reference images 501-503. As shown, during matching 611, the visual feature 521 in current frame 401 is matched to corresponding visual features 531-533 in reference images 501-503, respectively. A similar matching process may be employed as described above with reference to FIG. 5, with the exception that three reference images 501-503 may be considered instead of only reference image 501. In the example of FIG. 6, similarity scores 631-633 are computed for the matches of visual feature 521 to each of visual features 531-533, respectively. The similarity scores 631-633 represent the computed amount of similarity between visual feature 521 and each of visual features 531-533, respectively. For example, visual feature 521 has the highest similarity to visual feature 531 (with a score of sixty). Visual feature has the next highest similarity to visual feature 532 (with a score of thirty). Visual feature has the next highest similarity to visual feature 533 (with a score of ten). The similarity scores may be included as part of the soft and hard attention map described above. Thus, during matching 611, visual feature 521 is matched to visual features 531-533. Subsequently, during copying 612, the visual features 531-533 may be copied from reference image 501 to form a replacement visual feature 641. The enhanced frame 402 may then be generated by inserting the replacement visual feature 641 into current frame 401 to replace visual feature 521. In order to generate replacement visual feature 541, the visual features 531-533 may be modified. For example, the visual features 531-533 may be blended on similarity scores 631-633, in some cases proportionally, to form replacement visual feature 541. For example, in some cases, visual feature 531 may have a sixty percent influence over the appearance of replacement visual feature 541, visual feature 532 may have a thirty percent influence over the appearance of replacement visual feature 541, and visual feature 531 may have a ten percent influence over the appearance of replacement visual feature 541. In some examples, a learned CNN model may be employed to assist in blending of the visual features 531-533. Thus, the replacement visual feature 641 may be generated based on a copies of at least part of visual features 531-533. In order to generate replacement visual feature 641, the copies of visual features 531-533 may be modified, such as by modifying their sizes and shapes, for example to match the size and shape of visual feature 521.

In some examples, to assist in generating an enhanced frame for a current input frame, the backbone CNN component 112 of FIG. 1 may receive, as input, not only the current input frame but one or more other input frames of the input video stream 104, such as an immediately preceding frame (and optionally other preceding frames) and an immediately subsequent frame (and optionally other subsequent frames). The backbone CNN component 112 may use these other preceding and/or subsequent frames to assist in generating the enhanced frame corresponding to the current input frame. For example, the backbone CNN component 112 may maintain, for frames in the input video stream 104, an internal state that may be used to predict characteristics (e.g., location, size, shape, etc.) of visual features in the frames. The internal state may persist across predictions and may be updated at the end of each prediction. The prediction for any given frame may utilize features from the predictions made for the previous frame as well as other prior frames whose past predictions are maintained in the internal state. The video enhancement components 111 may utilize these predictions in various forms, such as by predicting optical flow and warping old features to spatially align with current features. Additionally, in some examples, the feature copying CNN component 113 may determine that the features available from the reference frame(s) aren't suitable for enhancing the current frame, such as when no matches above a similarity threshold are determined. In these scenarios, the backbone CNN component 112 may optionally utilize some alternative techniques, such as based on an auxiliary CNN, to enhance the current frame and may optionally ignore the reference frame features, thereby allocating computing resources dynamically.

Figure 7:
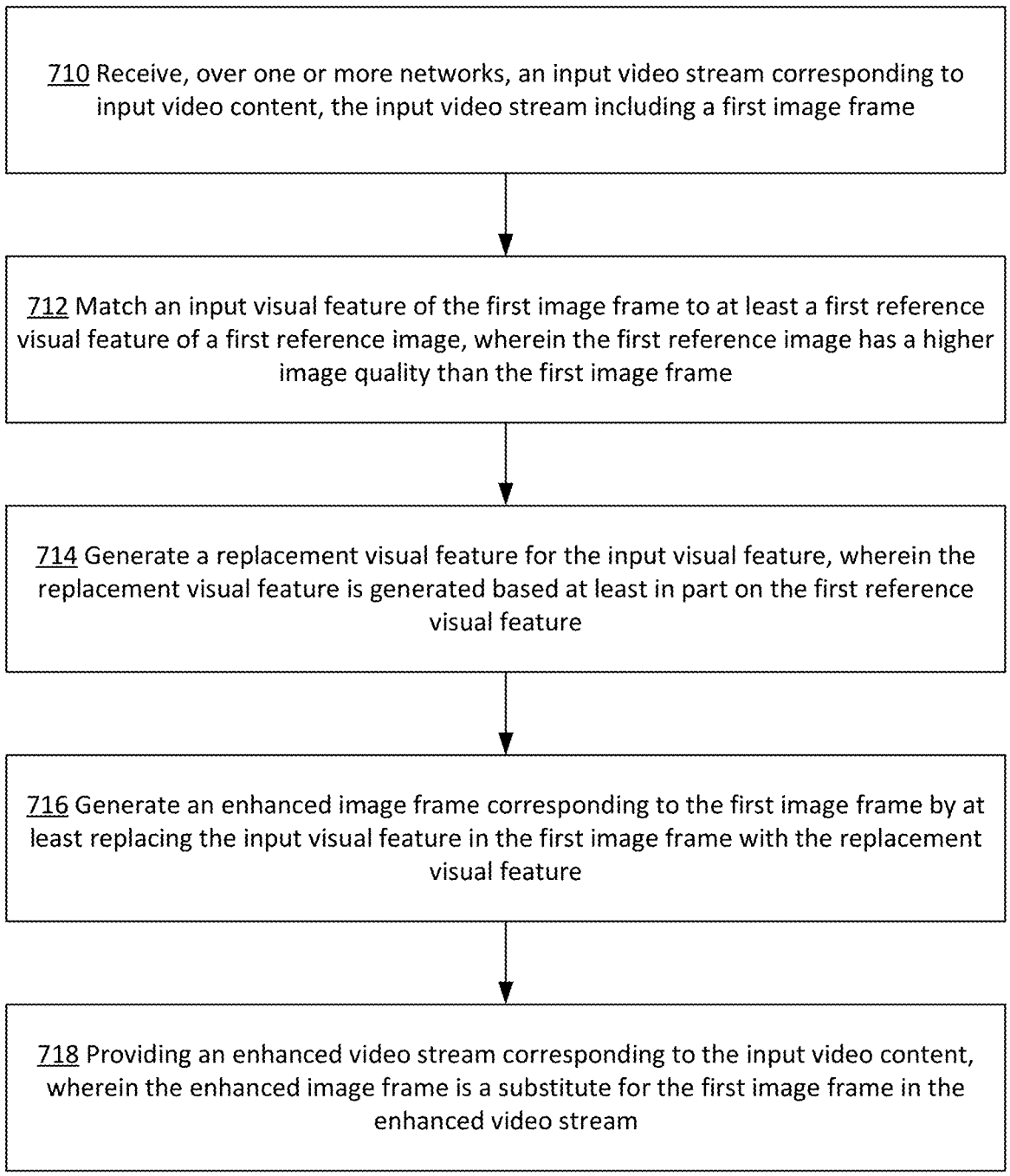
FIG. 7 is a flowchart illustrating an example streaming video enhancement process that may be used in accordance with the present disclosure.

FIG. 7 is a flowchart illustrating an example streaming video enhancement process that may be used in accordance with the present disclosure. In some examples, any, or all, of the operations 710-718 of FIG. 7 may be performed at least in part by one or more CNN-based models, for example including a backbone CNN-based model and a feature copying CNN-based model as described in detail above. The process of FIG. 7 is initiated at operation 710, at which an input video stream corresponding to input video content is received over one or more networks, the input video stream including a first image frame. For example, as shown in FIG. 1, input video stream 104, which corresponds to input video content 101, is received at receiving node 130 from transmitting node 120.

At operation 712, an input visual feature of the first image frame is matched to a first reference visual feature of a first reference image, wherein the first reference image has a higher image quality than the first image frame. For example, during matching 511 of FIG. 5, visual feature 521 of current frame 401 may be matched to visual feature 531 of reference image 501. As described above, reference images that are used to enhance an input video stream may have a higher image quality (e.g., a higher resolution, a higher encoding bitrate, etc.) than images in the input video stream. For example, the first image frame may have a first image quality, and the first reference image may have a second image quality, and the second image quality may be higher than the first image quality. As a specific example, the first image frame may have a first resolution, the first reference image may have a second resolution, and the second resolution may be higher than the first resolution. As another specific example, the first image frame may have a first encoding bitrate, the first reference image may have a second encoding bitrate, and the second encoding bitrate may be higher than the first encoding bitrate. This may be because, for example, the image quality of the input video stream may be downgraded during its encoding due to network bandwidth constraints. In some examples, the first reference image may correspond to a second image frame included in the input video content. Also, in some examples, the first reference image may be derived from the second image frame prior to encoding and degrading of the quality of the second image frame (e.g., via encoding 103A of FIGS. 1 and 2). For example, in some cases, a second video stream that includes the first reference image may be received over the one or more networks. The second video stream may have a lower frame rate (and a higher image quality) than the input video stream. In other cases, the first reference image may be included in the input video stream. For example, the input video stream may include primarily lower quality frames, with some higher quality frames that are intermittently transmitted as reference images. As described above, in some examples, the first reference image may be generated based at least in part on at least one of a full image technique, a masked image technique, a semantic segmentation technique, a foveated image technique, a learned compression technique, a change triggered technique, or a high dynamic range (HDR) technique. As also described above, in some examples, the first reference image may be obtained from a reference store that is compiled with stored images prior to initiation of transmission of the input video stream.

In some examples, the input visual feature and the first reference visual feature may be textures. Additionally, in some examples, the feature copying CNN component 113 may identify each visual feature in the first image frame, including the input visual feature. For example, the input image frame may be analyzed to find visual features that have distinct respective colors and/or patterns. Additionally, the feature copying CNN component 113 may identify each visual feature in the first reference image, including the first reference visual feature. For example, the first reference image may be analyzed to find visual features that have distinct respective colors and/or patterns. The feature copying CNN component 113 may then attempt to match each visual feature in the first image frame with a corresponding visual feature from the first reference image. For example, the feature copying CNN component 113 may attempt to match colors, patterns and/or other characteristics of each visual feature in the first image frame with colors, patterns and/or other characteristics of a visual feature from the first reference image. In some examples, the feature copying CNN component 113 may divide each input visual feature in the first image frame and each visual feature in the first reference image into smaller patches and perform patch level matches. When these visual features and/or patches in the first image frame and the first reference frame have a similarity that is above a specified threshold, then they may be considered as matches.

At operation 714, a replacement visual feature is generated for the input visual feature, wherein the replacement visual feature is generated based at least in part on the first reference visual feature. For example, as shown in FIG. 5, a replacement visual feature 541 is generated for visual feature 521. The replacement visual feature may be generated based at least in part on a copy of at least part of the first reference visual feature. In some examples, the replacement visual feature may be an exact copy of at least part of the first reference visual feature, with the exception that a size and shape of the copy may optionally be modified to match the size and shape of the input visual feature.

In some examples, the input visual feature may also be matched to a second reference visual feature of a second reference image. The second reference image may also have a higher image quality than the first image frame. While the first reference image and the second reference image may both have higher image qualities than the first image frame, it is not required that the first reference image and the second reference image must have the same exact image qualities as one another. The replacement visual feature may be generated based in part on the second reference visual feature (in addition to the first reference visual feature). For example, the generating of the replacement visual feature may include blending a first copy of at least part of the first reference visual feature with at least a second copy of at least part of the second reference visual feature. The blending may be based at least in part on a first similarity score for the first reference visual feature relative to the input visual feature and a second similarity score for the second reference visual feature relative to the input visual feature. For example, in some cases, the influence of each reference visual feature in forming the replacement visual feature may be proportional to (or otherwise based on) a respective similarity score. Thus, reference visual features with higher similarity scores may have more influence over the appearance of the replacement visual feature, while reference visual features with lower similarity scores may have less influence over the appearance of the replacement visual feature.

At operation 716, an enhanced image frame corresponding to the first image frame is generated by at least replacing the input visual feature in the first image frame with the replacement visual feature. For example, as shown in FIG. 5, an enhanced frame 402 corresponding to current frame 401 is generated by at least replacing visual feature 521 with replacement visual feature 541. In some examples, the replacement visual feature may be inserted into the enhanced video frame at the same location that was occupied by the input visual feature in the input image frame. In some examples, the replacement visual feature may have the identical size and shape as the input visual feature. Thus, the replacement visual feature may occupy the same portion of the enhanced video frame that was occupied by the input visual feature in the input image frame.

At operation 718, an enhanced video stream corresponding to the input video content is provided, wherein the enhanced image frame is a substitute for the first image frame in the enhanced video stream. For example, as shown in FIG. 4, enhanced video stream 115 includes enhanced frame 402. Operation 718 may include providing the enhanced video stream to a video player that plays the enhanced video stream. Operation 718 may also include providing the enhanced video stream to one or more intermediary components that, in turn, directly or indirectly provide the enhanced video stream to the video player. In the example of FIG. 1, enhanced video stream 115 is provided by video enhancement components 111 to video player 116 at receiving node 130. In the example of FIG. 2, the enhanced video stream 115 is provided by video enhancement components 111 for transmission over network 132 to receiving node 130, which includes video player 116. The enhanced video stream may include an enhanced version (i.e., enhanced using the techniques described herein) of at least one, and in some cases all, of the frames in the input video stream. Thus, the enhanced video stream may be provided to the video player. The video player may then play the enhanced video stream. Playing of the enhanced video stream may cause the enhanced video stream to be displayed to a viewer.

Figure 8:
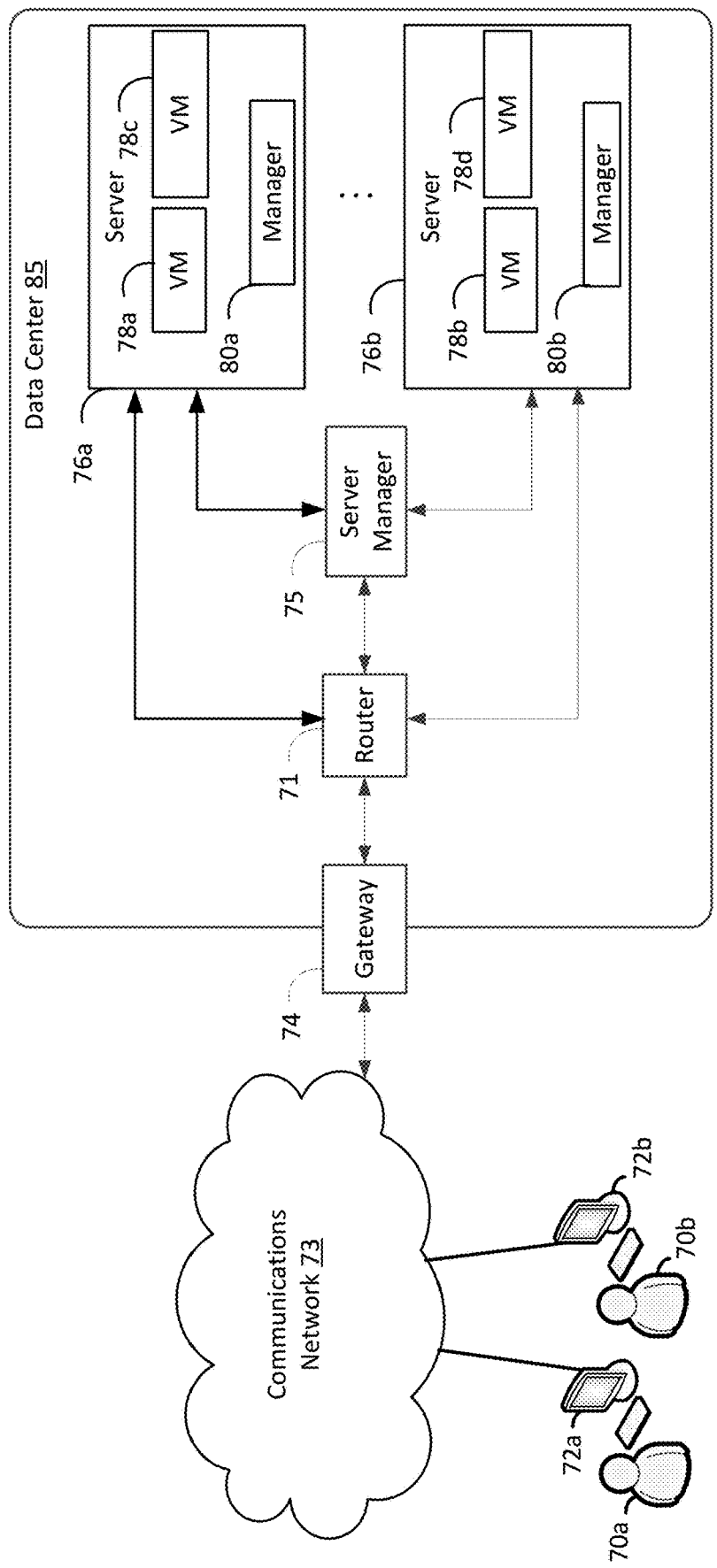
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
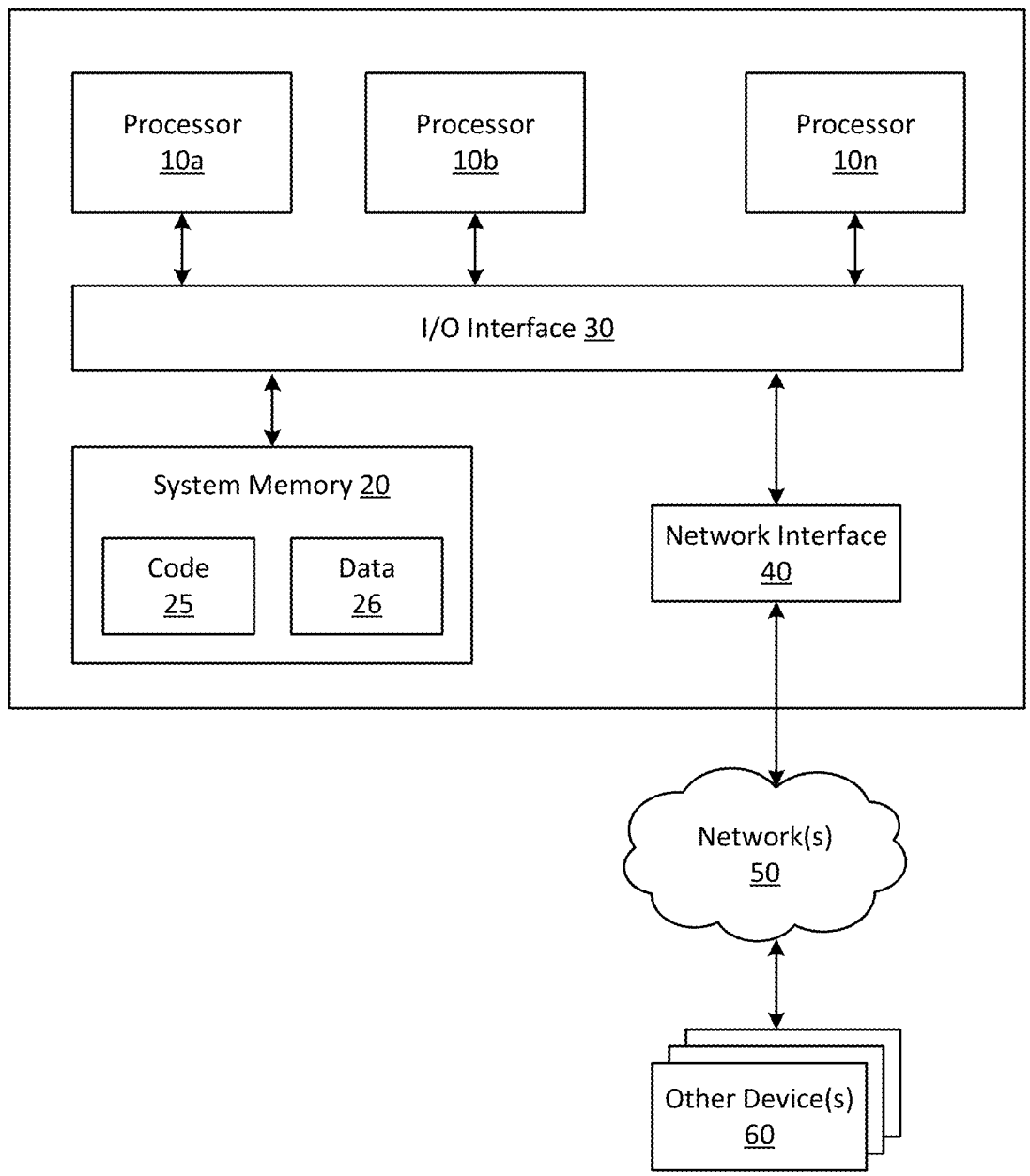
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein computing instructions that, upon execution by the one or more processors, cause the computing system to perform operations comprising:
   receiving, over one or more networks, an input video stream corresponding to input video content, the input video stream including a first image frame;
   receiving, over the one or more networks, a second video stream that includes a first reference image, wherein the second video stream has a lower frame rate than the input video stream;
   matching an input visual feature of the first image frame to at least a first reference visual feature of the first reference image, wherein the first reference image has a higher image quality than the first image frame, and wherein the first reference image corresponds to a second image frame included in the input video content;
   generating a replacement visual feature for the input visual feature, wherein the replacement visual feature is generated based at least in part on a copy of the first reference visual feature;
   generating an enhanced image frame corresponding to the first image frame by at least replacing the input visual feature in the first image frame with the replacement visual feature; and providing an enhanced video stream corresponding to the input video content, wherein the enhanced image frame is a substitute for the first image frame in the enhanced video stream.

2. The computing system of claim 1, wherein the input visual feature and the first reference visual feature are textures.

3. The computing system of claim 1, wherein the input visual feature is also matched to a second reference visual feature of a second reference image, wherein the second reference image has a higher image quality than the first image frame, and wherein the replacement visual feature is generated based in part on the second reference visual feature.

4. A computer-implemented method comprising:
  receiving, over one or more networks, an input video stream corresponding to input video content, the input video stream including a first image frame;
  receiving, over the one or more networks, a second video stream that includes a first reference image, wherein the second video stream has a lower frame rate than the input video stream;
  matching an input visual feature of the first image frame to at least a first reference visual feature of the first reference image, wherein the first reference image has a higher image quality than the first image frame;
  generating a replacement visual feature for the input visual feature, wherein the replacement visual feature is generated based at least in part on the first reference visual feature;
  generating an enhanced image frame corresponding to the first image frame by at least replacing the input visual feature in the first image frame with the replacement visual feature; and
  providing an enhanced video stream corresponding to the input video content, wherein the enhanced image frame is a substitute for the first image frame in the enhanced video stream.

5. The computer-implemented method of claim 4, wherein the first reference image corresponds to a second image frame included in the input video content.

6. The computer-implemented method of claim 5, wherein the first reference image is generated based at least in part on at least one of a full image technique, a masked image technique, a semantic segmentation technique, a foveated image technique, a learned compression technique, a change triggered technique, or a high dynamic range (HDR) technique.

7. The computer-implemented method of claim 4, further comprising:
  obtaining the first reference image from a reference store that is compiled with stored images prior to initiation of transmission of the input video stream.

8. The computer-implemented method of claim 4, wherein the input visual feature and the first reference visual feature are textures.

9. The computer-implemented method of claim 4, wherein the replacement visual feature is generated based at least in part on a copy of at least part of the first reference visual feature.

10. The computer-implemented method of claim 4, wherein the input visual feature is also matched to a second reference visual feature of a second reference image, wherein the second reference image has a higher image quality than the first image frame, and wherein the replacement visual feature is generated based in part on the second reference visual feature.

11. The computer-implemented method of claim 10, wherein the generating of the replacement visual feature comprises blending a first copy of at least part of the first reference visual feature with at least a second copy of at least part of the second reference visual feature.

12. The computer-implemented method of claim 11, wherein the blending is based at least in part on a first similarity score for the first reference visual feature relative to the input visual feature and a second similarity score for the second reference visual feature relative to the input visual feature.

13. One or more non-transitory computer-readable storage media having stored thereon computing instructions that, upon execution by one or more computing devices, cause the one or more computing devices to perform operations comprising:
  receiving, over one or more networks, an input video stream corresponding to input video content, the input video stream including a first image frame;
  receiving, over the one or more networks, a second video stream that includes a first reference image, wherein the second video stream has a lower frame rate than the input video stream;
  matching an input visual feature of the first image frame to at least a first reference visual feature of the first reference image, wherein the first reference image has a higher image quality than the first image frame;
  generating a replacement visual feature for the input visual feature, wherein the replacement visual feature is generated based at least in part on the first reference visual feature;
  generating an enhanced image frame corresponding to the first image frame by at least replacing the input visual feature in the first image frame with the replacement visual feature; and
  providing an enhanced video stream corresponding to the input video content, wherein the enhanced image frame is a substitute for the first image frame in the enhanced video stream.

14. The one or more non-transitory computer-readable storage media of claim 13, wherein the input visual feature and the first reference visual feature are textures.

15. The one or more non-transitory computer-readable storage media of claim 13, wherein the input visual feature is also matched to a second reference visual feature of a second reference image, wherein the second reference image has a higher image quality than the first image frame, and wherein the replacement visual feature is generated based in part on the second reference visual feature.

16. The one or more non-transitory computer-readable storage media of claim 15, wherein the generating of the replacement visual feature comprises blending a first copy of at least part of the first reference visual feature with at least a second copy of at least part of the second reference visual feature.

17. The one or more non-transitory computer-readable storage media of claim 16, wherein the blending is based at least in part on a first similarity score for the first reference visual feature relative to the input visual feature and a second similarity score for the second reference visual feature relative to the input visual feature.

* * * * *